ized as follows.

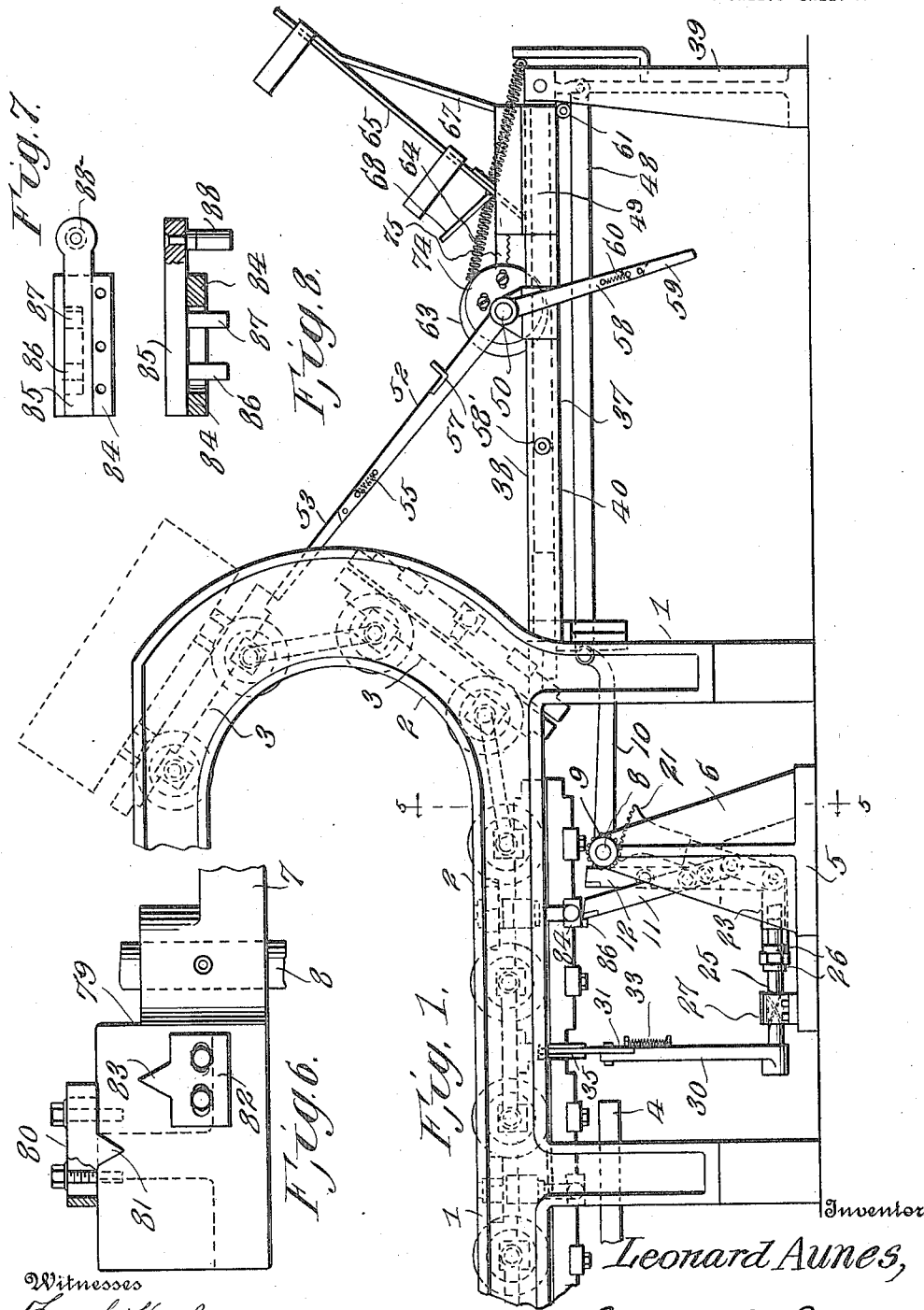

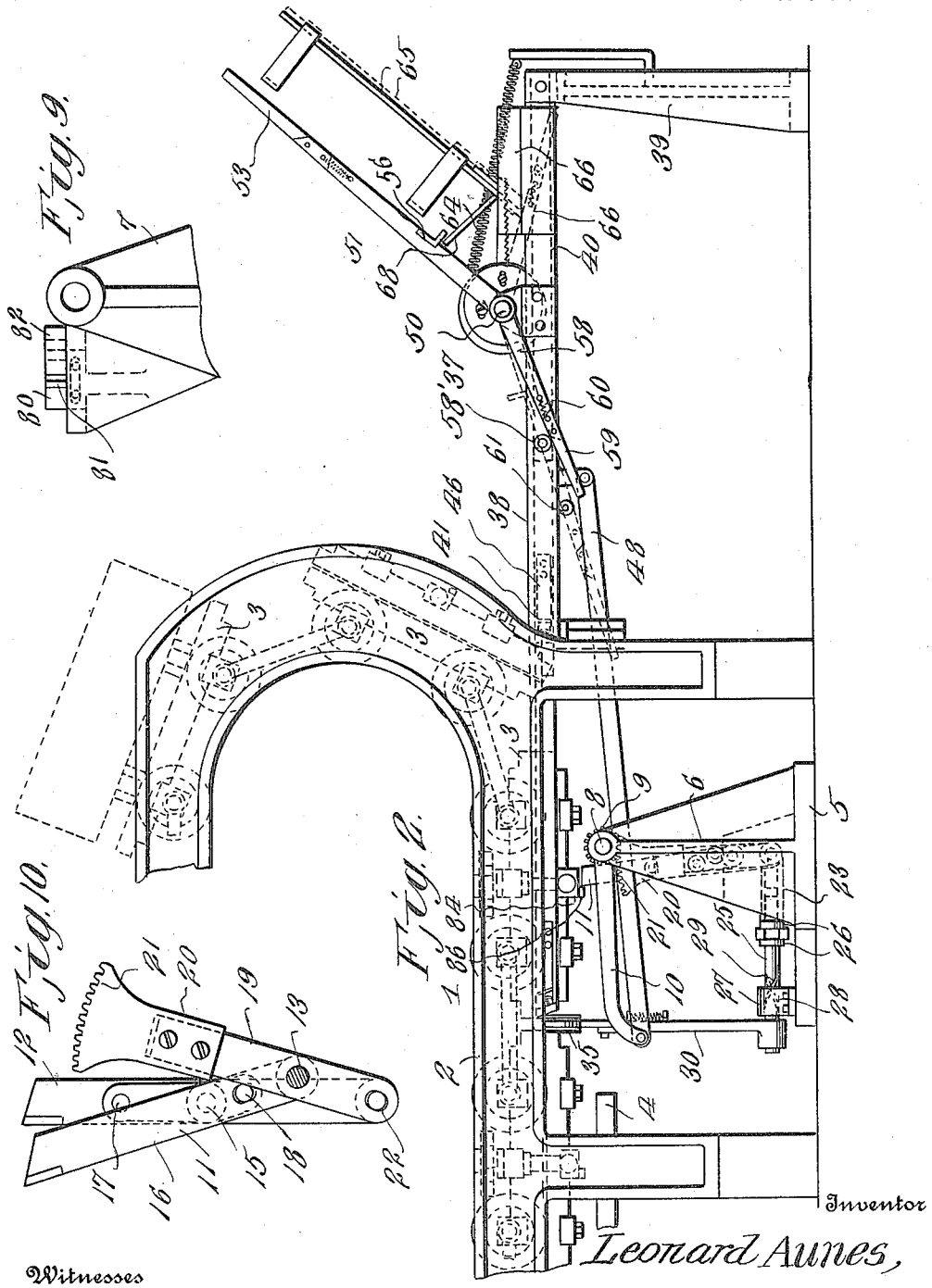

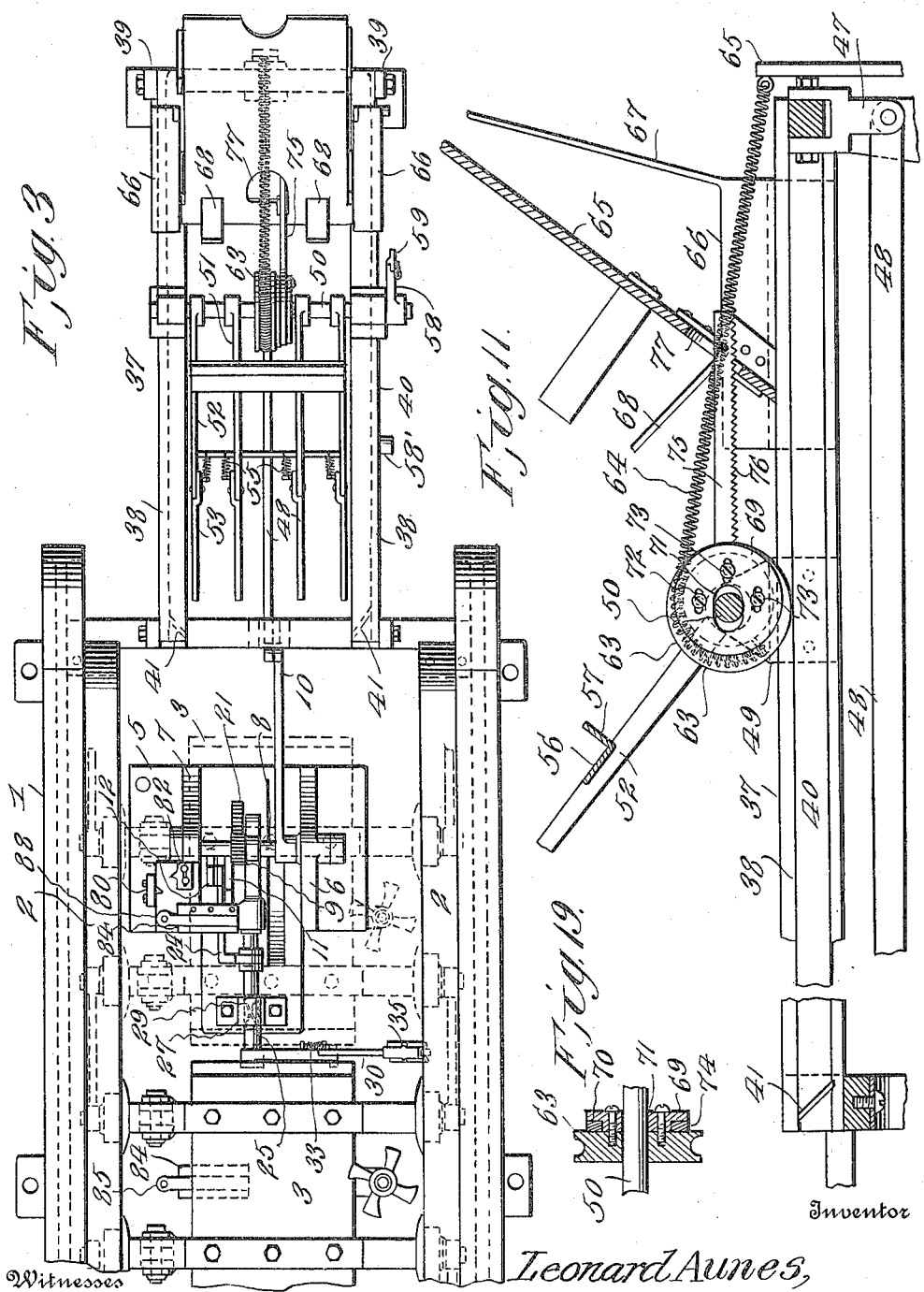

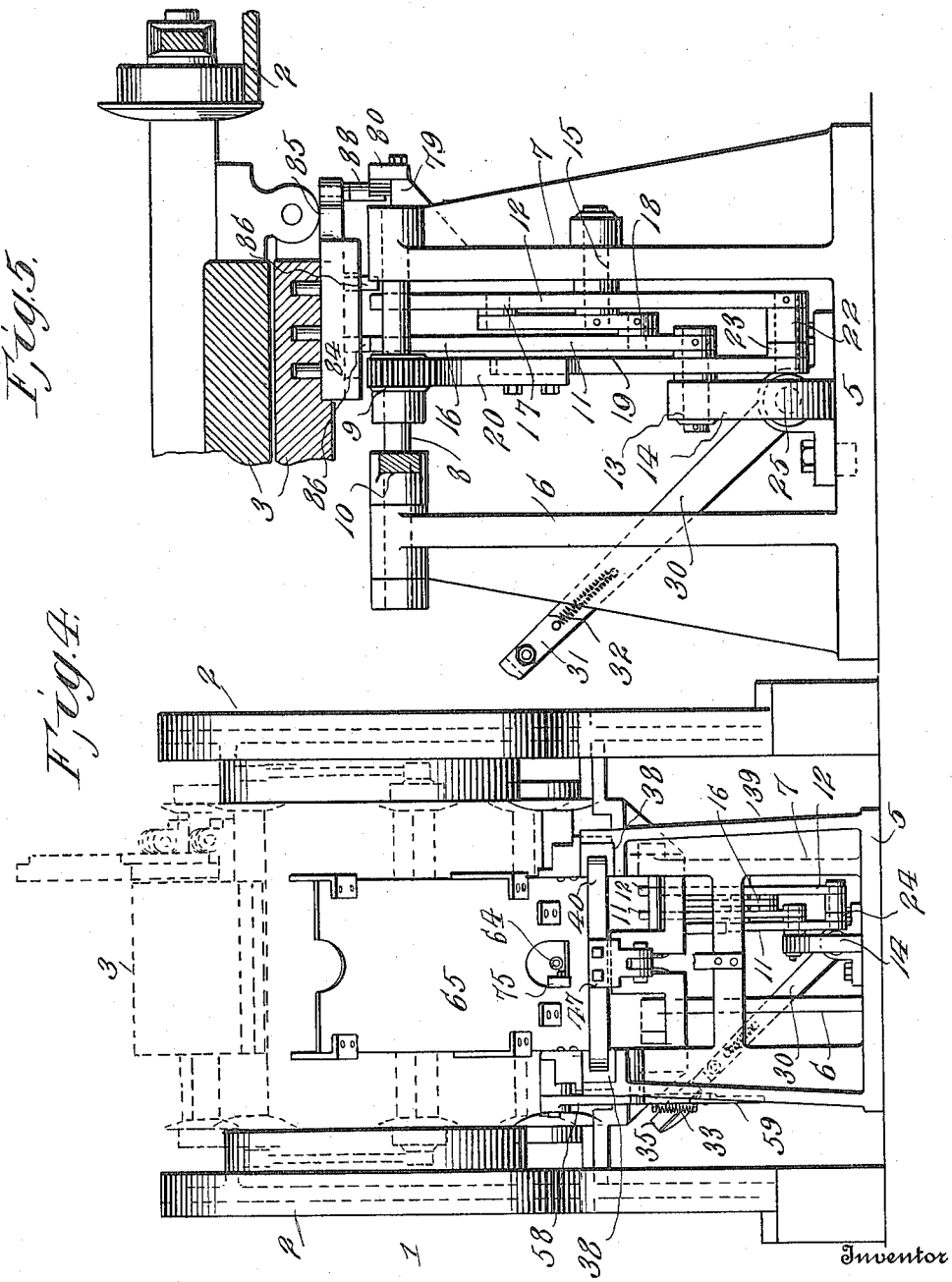

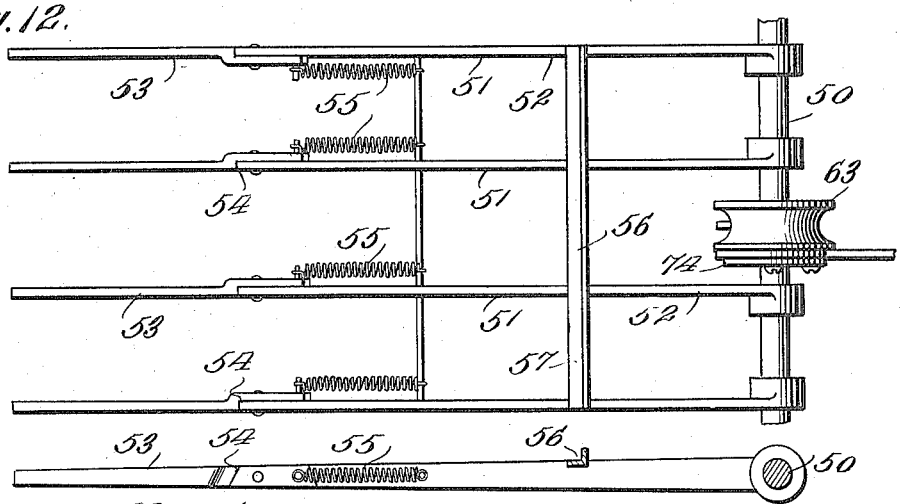

UNITED STATES PATENT OFFICE.

LEONARD AUNES, OF CAMBRIDGE, MASSACHUSETTS.

SUGAR-WAFER MACHINE.

1,164,566.

Specification of Letters Patent.

Patented Dec. 14, 1915.

Application filed July 24, 1914. Serial No. 852,878.

*To all whom it may concern:*

Be it known that I, LEONARD AUNES, a citizen of the United States, residing at Cambridge, in the county of Middlesex and State of Massachusetts, have invented new and useful Improvements in Sugar-Wafer Machines, of which the following is a specification.

The invention relates to an improvement in sugar wafer machines, and particularly to the combination with an ordinary type of such machine of an automatic trimmer and receiver, whereby the material ordinarily extending beyond the edges of the iron is trimmed subsequent to the baking, and the completed wafer after trimming automatically delivered to a receiver. In the ordinary use of these machines, it has been customary to cut the dough extending beyond the edges of the iron by the closing of the iron and by the baking process, from such edges by an operator standing in front of the machine, so that when the irons open to deliver the cake, it is trimmed ready for the icing machine and for the usual sawing operation.

The present invention is designed with a view to eliminating the trimmer or operator heretofore performing this trimming operation and to provide an automatic device which will effectively trim excess dough so as to deliver cakes from the irons in a properly trimmed and uniform condition.

The invention in the preferred form of details will be described in the following specification, reference being had particularly to the accompanying drawings, in which:

Figure 1 is a broken side elevation of the improved machine with the receiver in position to receive a cake from the iron. Fig. 2 is a similar view with the receiver in a delivery position, and showing the trimmers in the final operation or trimming position. Fig. 3 is a plan of the machine with the parts in position illustrated in Fig. 1. Fig. 4 is an end elevation of the machine showing the parts in their normal position. Fig. 5 is a sectional view transversely of the machine and beyond the trimmer operating mechanism. Fig. 6 is a broken top plan showing means for controlling the actuating lug on the baking irons. Figs. 7 and 8 are plan sectional views respectively of such actuating lug. Fig. 9 is an edge view showing means for controlling the actuating lug. Fig. 10 is an enlarged elevation of the trimmer actuating levers. Fig. 11 is a longitudinal sectional view through the receiver frame. Fig. 12 is a plan showing the receiver fingers. Fig. 13 is a sectional view of the same, illustrating one of the fingers. Fig. 14 is a plan of the longitudinal cutter frame and cutters. Fig. 15 is a side elevation of the same. Fig. 16 is an end view of the transverse cutter. Fig. 17 shows edge and side views of the same. Fig. 18 is a plan of the receiving tray. Fig. 19 is a detail sectional view of the receiver operating mechanism.

In the following description, I shall refer separately and independently to the trimming mechanism and to the receiving mechanism, the first of which is designed to trim the excess dough from the baking irons, while the latter is to receive and pile the cakes after cooking and delivery from said irons. The construction and also the illustration in the parts not specifically herein referred to is of a conventional type of what is known as sugar wafer machines, wherein dough is delivered to a series of baking irons connected in chain like form and adapted for travel on guide runways from a position where they are charged with the material to and above the burners for cooking the material and to a position where they are operated to deliver the baked material, means being provided for automatically opening the irons at their receiving and delivery points.

For the purpose of the description, the main frame of the machine will be generally designated as 1, which frame includes guide runways 2 arranged in spaced relation and coöperating with which for appropriate travel are the cooking irons 3 including upper and lower sections, the material being received, between the sections when the latter are open, the sections being subsequently closed and the baking irons caused to travel in such closed position above heaters as 4 for cooking the material, the sections of the irons being subsequently separated to permit the cooked cake to gravitate therefrom, the guide runways being so arranged that in the delivery position the irons are elevated and at a downward and outward inclination to insure such gravital delivery, as clearly shown in Fig. 1.

*The trimming mechanism.*—As a preferred embodiment of the trimming mechanism, I provide an auxiliary base 5 located adjacent the forward or delivery end of the machine, from which extend spaced parallel uprights 6 and 7. A shaft 8 is rotatably supported in the upper end of the uprights, on which shaft at a point intermediate the uprights is arranged a pinion 9, and on the end of the shaft beyond and immediately adjacent one upright is secured an arm 10. An actuating means for the trimmers is provided through spaced operating levers 11 and 12, the former of which positively operates the trimmers and the latter returns them to normal position. The lower end of the lever 11 is secured upon the shaft 13 rotatably supported in the short upright 14 rising from the base 5, while the lever 12 is fulcrumed intermediate its ends upon a shaft 15 rotatably mounted in the upright 6. A link 16 is fulcrumed upon the shaft 15, being arranged between levers 11 and 12, the length being pivotally connected at its respective ends above and below its fulcrum and the respective levers, as at 17 and 18. An operating arm 19 is secured upon the shaft 13 intermediate its ends so that said arm turns with the shaft, the upper end of the arm carrying a member 20 on which is secured a gear segment 21, the latter being arranged to mesh with the pinion 9 so that in the movement of the arm 19 the shaft 8 is rotated.

The lever 12 and arm 19 terminate in a plane below the shaft 13 and are connected by a shaft 22 on which is secured an arm 23. The arm extends in parallel relation to the upper surface of the base and has at a point remote from the shaft 22 a lateral extension 24. This extension is connected to a horizontal shaft 25 so as to permit independent rotative movement of said shaft to prevent independent longitudinal movement thereof with respect to said arm, the illustrated connection being the slitting of the terminal of the arm and engagement of said slotted portion with the shaft between the collars 26. The shaft is slidably mounted in a bearing 27 rising from the base, which bearing is provided with a lateral pin 28 adapted to engage a spiral slot or key way 29 in the shaft, so that the shaft will be given a reciprocatory rotary motion during its longitudinal reciprocation. Secured upon the end of the shaft 25 is a transverse cutter including an arm 30 and to an upper end of which is pivotally connected the cutter arm 31, the arm 30 being recessed in its upper portion to receive the lower end of the cutter arm, and the lower edge of said cutter arm and the coöperating wall of the recess being inclined as at 32, whereby swinging movement of the cutter arm with relation to the arm 30 is permitted in one direction but prevented in the other, as will be obvious from Fig. 17. A spring 33 connects the arm 30 and cutter arm to normally hold the members in alined position. The upper end of the cutter arm is provided with a cutting element 34 of U-form having side portions 35 of spring type and normally spaced from the side portions of the arm, each of said side portions including horizontal ribs 36, adapted as the cutter rides between adjacent ends of neighboring irons to engage the edges of said irons and compel by the pressure on the blade portions an effective operation of said blade portions with the adjacent edges of such irons.

Secured to the delivery end of the machine and projecting beyond the same is an auxiliary frame 37 including channel bars 38 arranged in spaced parallel relation with channel portions disposed in proximate arrangement. The inner ends of the bars are connected to the main frame 1 through a cross piece 38′ and the outer end supported upon uprights 39, the frame being arranged in horizontal alinement with the lower path of travel of the irons. Mounted for sliding movement in this frame is a U-shaped carrier 40 constituting a longitudinal cutter. The inner ends, that is the ends adjacent the main frame, are beveled or inclined in both the horizontal and vertical directions, the vertical inclination being downwardly and forwardly and the horizontal inclination being outwardly and forwardly. On such inclined ends are arranged cutters 41 comprising approximately Y-shaped members having their ends 42 sharpened to provide cutting edges, the reduced portion of the members being longitudinally slotted at 43 to engage pins 44 threaded into the ends of the frame bars. The corners of the cutters 41 are rounded, as shown, in order to avoid ineffectiveness of such cutters through contact between the cutters and the ends of the plates as the cutters move into operative position. The cutters project toward each other, and in the outer surface of each frame bar there is formed a recess 45 for the reception of leaf spring 46 which bears against the end of the cutters so as to normally maintain them in proper position, while permitting yielding outwardly to accommodate themselves to irregular formation or position of the particular iron on which they are operating. The cross bar of the frame 40 is connected by a bracket 47 to the bar 48 which in turn is connected to the curved end of the arm 10, so that in the sweep of said arm 10 the longitudinal cutter frame 40 is reciprocated.

*Receiver.*—Supported in plates 49 rising from the frame bars 38 is a shaft 50 on which is secured spaced parallel receiving fingers 51. The fingers are connected for simultaneous movement through their attachment to the shaft and are each constructed of inner and outer sections 52, 53, the outer section being pivotally connected to the inner section and having its lower or rear edge inclined and bearing against a correspondingly inclined shoulder on the inner section as at 54, Fig. 13, the arrangement of the inclination permitting a swinging movement of the outer sections with relation to the inner sections in one direction, while preventing it in the opposite direction. Springs 55 are connected to maintain a normal or alined position of the sections. The fingers are provided with a transverse shelf 56 having an outwardly extending lip 57 forming a stop for the lower edge of the received cake as will later appear.

The receiver fingers are positively operated in reverse directions, the fingers being moved into receiving position through the medium of the arm 58 secured upon one end of the shaft 50 and having an outer pivotally connected section 59 adapted to break in one direction and normally held in alinement with the main section by a spring 60. The arm 58 is operated through the medium of a roller 61 mounted on the lower end of the strip 62 depending from the inner edge of one of the arms of the cutter frame 40, the lower ledge of the channel portion of the fixed frame 38 receiving such frame portion 40 being cut away to permit movement of the strip without interference. There is also provided a means for operating the receiving fingers toward the receiving tray to be later described, such means comprising a grooved roller 63 fixed upon the shaft 50 and a coiled extension spring 64 terminally fixed to the roller and to a bracket 65 secured to the rear or outer portion of the uprights 39, as shown. As the frame 40 reciprocates, the receiving fingers are operated, the movement of the frame toward the machine proper causing the roller 61 to pass the arm 58, slightly displacing the section 59 to permit this result. As the frame moves in the opposite direction, the roller engages the arm and rocks the shaft to move the fingers into coöperation with the particular iron, as will later appear. A stop 58' is provided against which the arm 58 contacts to prevent the receiver fingers from cutting too far backward and thereby avoid possibility of crushing or breaking the successive cakes deposited in the receiver.

The receiver proper comprises a platform or sheet 65 secured at the lower end to opposing guides 66 which are formed to coöperate with a channel frame portion 38 so as to slide thereon. The platform 65 is inclined upwardly and rearwardly and braced by a section 67. The platform which is approximately of a width corresponding to that between the side bars of the frame 38 is formed with supporting fingers 68, projecting at an appropriate angle thereto near the lower end, the fingers forming supports for the lower edge of the cakes. As the receiver proper is designed to accommodate a number of cakes, means must be provided whereby said receiver will be gradually moved rearwardly as successive cakes are deposited. To secure this result, I mount upon the grooved pulley 63 a holder in the form of a disk like member 69 having a reduced shouldered portion 70, the disk member 69 being formed with a slot 71 to encircle the shaft 50 and with a series of slots 72 to receive screws 73, whereby the disk member is secured to one surface of the pulley 63, while permitting an adjustment as desired. A band 74 encircles the shoulder 70 of the disk member resting between the disk and the grooved pulley, the position of the disk 69 on the grooved pulley constituting the band 74 as an eccentric strap. An arm 75 extends rigidly from such eccentric strap, the lower edge of which is formed with a series of teeth 76 projecting in the rearward direction, that is toward the receiver proper. The receiver is formed with an opening 77 through which the spring 64 passes, one edge of the opening having a toothed plate 78 with which the teeth 76 coöperate. From this description, it will be obvious that a step for step movement will be imparted to the receiver proper, in each actuation of the receiving fingers whereby compensation is made for the thickness of the successive cakes as they are deposited on the receiver.

The respective cutters are automatically operated by the travel of the irons, and the means whereby this is accomplished is illustrated particularly in Figs. 6, 7, and 8. Projecting from one of the uprights, as 7, is a plate 79 on which near what may be termed its outer edge, is secured a block 80 having a V-shaped extension 81 to overlie and form an abutment on the plate 79. A plate 82 is adjustably secured upon the plate 79 in advance of the abutment 80, said plate 82 having a similar V-shaped projection 83 extending toward the abutment 81 and forming a corresponding abutment above the surface of the plate 79. On the bottom of each iron, at an appropriate point, is secured a block 84 in which is slidably mounted an actuating member comprising a bar 85 having depending therefrom through a slot in the plate spaced lugs 86 and 87. The bar 85 extends beyond the plate and is provided with a depending stem having a roller 88 secured thereon. The lugs 86 and 87 are designed to coöperate with and respectively operate the levers 11 and 12, the roller 88 being designed to shift the bar 85 through engagement with the abutments 81 and 83.

Assuming the parts constructed and arranged as described, it will be obvious that as an iron with the contained material approaches the improved cutting mechanism, the cake will have been cooked. As will later appear, it will be understood that the lug 86 is normally in position to engage the lever 11. As the iron advances, this lug through its engagement with the lever, will through the arm 19, section 20, gear 21, and pinion 9, rock the shaft 8. This, from the previously described structure, operates the transverse cutter, the longitudinal cutters, and positions the roller 61 in advance of the arm 58. This movement of the lever 11 will through the link 16, move the lever 12 in the opposite direction. As the lug 86 actuates the lever 11 the roller 88 moves into engagement with the abutment 81 on the plate 79, this coöperation shifting the lug 86 laterally of the lever 11 and shifting the lug 87 in the plane of the lever 12. The further advance of the iron operates the lever 12 to reverse the movement just described, returning the cutters to normal position. Immediately succeeding such operation of the lever 12, the roller 88 coöperates with the abutment 83 shifting the lug 87 laterally of the lever 12 and returning the block 85 to normal position, which is that the lug 86 is so arranged that it will engage the lever 11 in the next coöperation of the particular iron therewith. In the return of the longitudinal trimmer frame 40, the roller 61 engages the arm 58 and forces the receiving fingers into a position to coöperate with the iron just being opened to discharge the cake. As the fingers ride into receiving position, the respective sections thereof will break to permit the free end of the outer section to ride beneath the iron until it occupies a position shown in Fig. 1. The release of the fingers from the carried cake causes the spring 64 to return the fingers to normal position, delivering the cake to the receiving tray.

From the above description, it will be obvious that the improved machine automatically trims both sides and ends of the iron, so as to remove excess material and that a resultant product presents cakes of uniform size and eliminates the necessity of an attendant hereinbefore referred to, required for the hand trimming to gain this result.

What is claimed is:—

1. In a sugar wafer machine including material cooking irons arranged for successive endwise travel and an arm moving transversely between adjacent irons and means, carried by the ends of the arm for trimming the end edges thereof simultaneously.

2. In a sugar wafer machine including material cooking irons arranged for successive endwise travel and an arm moving transversely between adjacent irons and means, carried by the ends of the arm for trimming the end edges thereof simultaneously, an independent means for trimming the longitudinal edges of the irons.

3. In a sugar wafer machine including material cooking irons arranged for successive endwise travel and an arm moving transversely between adjacent irons and means, carried by the ends of the arm for trimming the end edges thereof simultaneously, an independent means for trimming the longitudinal edges of the irons, and means operated by the irons for actuating said arm and independent means.

4. A sugar wafer machine including material cooking irons, a receiver for the article, fingers for transferring the article from the irons to the receiver, and means controlled by the irons for operating the fingers toward the irons.

5. A sugar wafer machine including material cooking irons, a receiver for the article, fingers for transferring the article from the irons to the receiver, means controlled by the irons for operating the fingers toward the irons, and means for automatically moving the fingers in the opposite direction independently of the means controlled by the irons.

6. A sugar wafer machine including a series of material irons connected for successive travel, an edge trimmer simultaneously coöperating with adjacent transverse edges of successive irons, and means actuated by the irons for operating said trimmer.

7. A sugar wafer machine including a series of material irons connected for successive travel, an edge trimmer simultaneously coöperating with adjacent transverse edges of successive irons, an edge trimmer coöperating with the side edges of the irons, and means operated by the irons for actuating both of said trimmers.

8. A trimming mechanism for sugar wafer machines, including a longitudinally reciprocatory frame, trimmers carried thereby, oppositely acting levers, and connections intermediate the levers and frame for reversely operating the frame in the movement of the respective levers.

9. A trimming mechanism for sugar wafer machines including a trimming arm, a trimmer carried thereby, a shaft connected to the arm and adapted for rotary reciprocatory movement, and means for operating the shaft.

10. A trimming mechanism for sugar wafer machines including a shaft, means for moving the shaft longitudinally, means for rotating the shaft during such longitudinal movement, an arm secured to the shaft and a trimmer carried by the arm and adapted for independent movement with relation thereto.

11. A trimming mechanism for sugar wafer machines, including operating levers adapted for reverse actuation, a rack operated by said levers, a pinion operated by the rack, an arm connected to the pinion, and a reciprocatory trimmer frame connected to the arm.

12. A sugar wafer machine including traveling cooking irons, a trimming mechanism for said irons, operating levers for actuating the trimming mechanism in reverse directions, a lever operating element carried by each iron, and means for shifting the element to cause its successive coöperation with the respective levers.

In testimony whereof I affix my signature in presence of two witnesses.

LEONARD AUNES.

Witnesses:
JOHN R. F. HENSEN,
PETER PEARSON.

Copies of this patent may be obtained for five cents each, by addressing the "Commissioner of Patents, Washington, D. C."